(12) United States Patent
Moon et al.

(10) Patent No.: US 9,154,772 B2
(45) Date of Patent: Oct. 6, 2015

(54) METHOD AND APPARATUS FOR CONVERTING 2D CONTENT INTO 3D CONTENT

(75) Inventors: Ji-bum Moon, Seoul (KR); Han-soo Kim, Seongnam-si (KR); Oh-jae Kwon, Suwon-si (KR); Won-seok Ahn, Yongin-si (KR); Seung-hoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 505 days.

(21) Appl. No.: 13/602,694

(22) Filed: Sep. 4, 2012

(65) Prior Publication Data
US 2013/0076858 A1 Mar. 28, 2013

(30) Foreign Application Priority Data
Sep. 26, 2011 (KR) ........................ 10-2011-0097008

(51) Int. Cl.
G06K 9/34 (2006.01)
H04N 13/02 (2006.01)
G06T 7/00 (2006.01)
G06T 15/00 (2011.01)

(52) U.S. Cl.
CPC ............ *H04N 13/026* (2013.01); *G06T 7/0081* (2013.01); *G06T 15/00* (2013.01)

(58) Field of Classification Search
USPC .................................................. 382/173, 285
See application file for complete search history.

(56) References Cited

U.S. PATENT DOCUMENTS

| 6,760,488 B1 * | 7/2004 | Moura et al. .................. 382/285 |
| 8,848,038 B2 * | 9/2014 | Yang et al. ...................... 348/43 |
| 2009/0044117 A1 | 2/2009 | Vaughan et al. |
| 2010/0014781 A1 * | 1/2010 | Liu et al. ........................ 382/285 |
| 2011/0032329 A1 * | 2/2011 | Bauza et al. ..................... 348/43 |
| 2011/0038536 A1 | 2/2011 | Gong |
| 2011/0069152 A1 * | 3/2011 | Wang et al. ..................... 348/43 |
| 2011/0149039 A1 | 6/2011 | Kim et al. |
| 2012/0188334 A1 * | 7/2012 | Fortin et al. ..................... 348/43 |
| 2013/0002820 A1 * | 1/2013 | Francisco ....................... 348/43 |
| 2013/0235155 A1 * | 9/2013 | Feng et al. ...................... 348/43 |

FOREIGN PATENT DOCUMENTS

JP 2008-243226 A 10/2008

OTHER PUBLICATIONS

Communication dated Nov. 28, 2013 issued by the European Patent Office in counterpart European Patent Application No. 12173663.1.
(Continued)

*Primary Examiner* — Yon Couso
(74) *Attorney, Agent, or Firm* — Sughrue Mion, PLLC

(57) ABSTRACT

A method and apparatus for converting two-dimensional (2D) contents into three-dimensional (3D) contents is disclosed. The method including: displaying a frame, the frame containing an object which will be extracted from among plural frames contained in the 2D contents; designating a boundary region of an object to be extracted on the displayed frame, in accordance with a user command through a user interface (UI) for collectively designating a region; generating a trimap based on the designated boundary region including inner and outer regions of the object to be extracted, and extracting the object based on the generated trimap. With this, a user can more conveniently and efficiently convert 2D contents into 3D contents.

21 Claims, 7 Drawing Sheets

(56) References Cited

OTHER PUBLICATIONS

Olivier Juan, et al.; "Trimap Segmentation for Fast and User-Friendly Alpha Matting"; Variational, Geometric, and Level Set Methods in Computer Vision:Third International Workshop, VLSM 2005; Oct. 16, 2005; XP019021865; pp. 186-197.

Chenglei Wu et al.; "A Novel Method for Semi-automatic 2D to 3D Video Conversion"; 3DTV Conference:The True Vision Capture, Transmission and Display of 3D Video; May 28, 2008; XP031275212; pp. 65-68.

Xun Cao, et al.; "Converting 2D Video to 3D: An Efficient Path to a 3D Experience"; IEEE Multimedia; vol. 18; No. 4; Apr. 1, 2011; XP011378369; pp. 12-17.

* cited by examiner

METHOD AND APPARATUS FOR CONVERTING 2D CONTENT INTO 3D CONTENT

CROSS-REFERENCE TO RELATED APPLICATION

This application claims priority from Korean Patent Application No. 10-2011-0097008, filed on Sep. 26, 2011 in the Korean Intellectual Property Office, the disclosure of which is incorporated herein by reference.

BACKGROUND

1. Field

Methods and apparatuses consistent with the exemplary embodiments relate to a method and apparatus for converting contents, and more particularly to a method and apparatus for converting 2D contents into 3D contents.

2. Description of the Related Art

Video content such as films; drama; sports games; etc. (hereinafter, referred to as a 'content'), is reproduced by a display apparatus having a content play function such as a television (TV); personal computer (PC); smart phone; smart pad; portable multimedia player (PMP), an MP3 player, etc. With the recent development of 3D image display technology, such contents are produced as 3D contents and reproduced by a display apparatus capable of displaying a 3D image.

To reduce the time, cost, etc., taken in producing such 3D contents, technology of acquiring 3D contents by applying a predetermined conversion technology to 2D contents has been proposed.

In conversion technologies, there is a need for extracting an object from a video frame of 2D content (hereinafter, referred to as a 'frame'), and assigning depth to the extracted object of the 2D content.

During object extraction and depth assignment, a user (worker) may work at converting the object to be extracted while viewing the displayed frame through a user interface provided by a content converting apparatus. The UI used for the converting work is needed to provide useful functions, so that a user can more conveniently and efficiently perform the work.

SUMMARY

One or more of the exemplary embodiments may provide a method and apparatus for converting contents, which can offer a user interface (UI) which is convenient for a user to more easily and efficiently convert 2D contents into 3D contents.

According to an aspect of an exemplary embodiment, there is provided a method of converting video contents. The method converts two-dimensional (2D) contents into three-dimensional (3D) contents through a content converting apparatus. The method includes: displaying a frame which includes an object which will be extracted from among plural frames contained in the 2D contents; designating a boundary region of an object to be extracted, on the displayed frame, in accordance with a user's command through a user interface (UI) for collectively designating a region; generating a trimap including inner and outer regions of the object to be extracted, based on the designated boundary region; and extracting the object based on the generated trimap.

The designating of the boundary region may include designating an inner boundary and an outer boundary spaced from each other by a predetermined thickness, and the generating of the trimap may include determining the inner region based on the inner boundary, determining the outer region based on the outer boundary, and determining a region between the inner boundary and the outer boundary as the boundary region.

The UI may be shaped like a line having a thickness corresponding to the region between the inner boundary and the outer boundary, and the designating of the boundary region may include drawing the line in accordance with a user command to designate the boundary region.

The method may further include adjusting the thickness of the line in accordance with a user command.

The method may further include designating the inner region of the object to be extracted in accordance with a user command through the UI, and the designating of the boundary region may include designating the boundary region with regard to the designated inner region.

The UI may be shown in a figure having a predetermined size, and the designating of the boundary region may include designating a region, formed by a trace where the figure is moved in accordance with a user command, as the boundary region.

The figure may include a circle.

The method may further include the size of the figure in accordance with a user command.

According to an aspect of an exemplary embodiment, there is provided an apparatus for converting video contents, which converts two-dimensional (2D) contents into three-dimensional (3D) contents, the apparatus including: a user input unit which receives a user command; a display unit; and a converter which displays a frame, an object which will be extracted from among plural frames contained in the 2D contents, designating a boundary region of an object to be extracted on the displayed frame in accordance with a user command through a user interface (UI) for collectively designating a region, generating a trimap including inner and outer regions of the object to be extracted, based on the designated boundary region, and extracts the object based on the generated trimap.

The converter may designate an inner boundary and an outer boundary which are spaced from each other by a predetermined thickness to designate the boundary region, determine the inner region based on the inner boundary, determine the outer region based on the outer boundary, and determine, as the boundary region, a region between the inner boundary and the outer boundary.

The UI may be shaped like a line having thickness which corresponds to the region between the inner boundary and the outer boundary, and the converter may draw the line to designate the boundary region in accordance with a user command.

The converter may adjust the thickness of the line in accordance with a user command.

The converter may designate the inner region of the object to be extracted in accordance with a user command through the UI, and may designate the boundary region with regard to the designated inner region.

The UI may be shown in a figure having a predetermined size, and the converter may designate a region, formed by a trace where the figure is moved in accordance with a user command, as the boundary region.

The figure may include a circle.

The converter may adjust the size of the figure in accordance with a user command.

The exemplary embodiments may further include a method of converting video contents, which converts two-dimensional (2D) contents into three-dimensional (3D) contents through a content converting apparatus, the method including: displaying a 2D frame including an object which will be extracted; designating a boundary region of the object to be extracted on the displayed frame; generating a trimap based on the designated boundary region, the trimap comprising inner and outer regions of the object to be extracted; and extracting the object based on the generated trimap.

The exemplary embodiments may further include an apparatus for converting video contents, which converts two-dimensional (2D) contents into three-dimensional (3D) contents, the apparatus including: a converter which displays a 2D frame including an object which will be extracted, designates a boundary region of an object to be extracted on the displayed frame, generates a trimap comprising inner and outer regions of the object to be extracted, and extracts the object based on the generated trimap.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Figure 1:
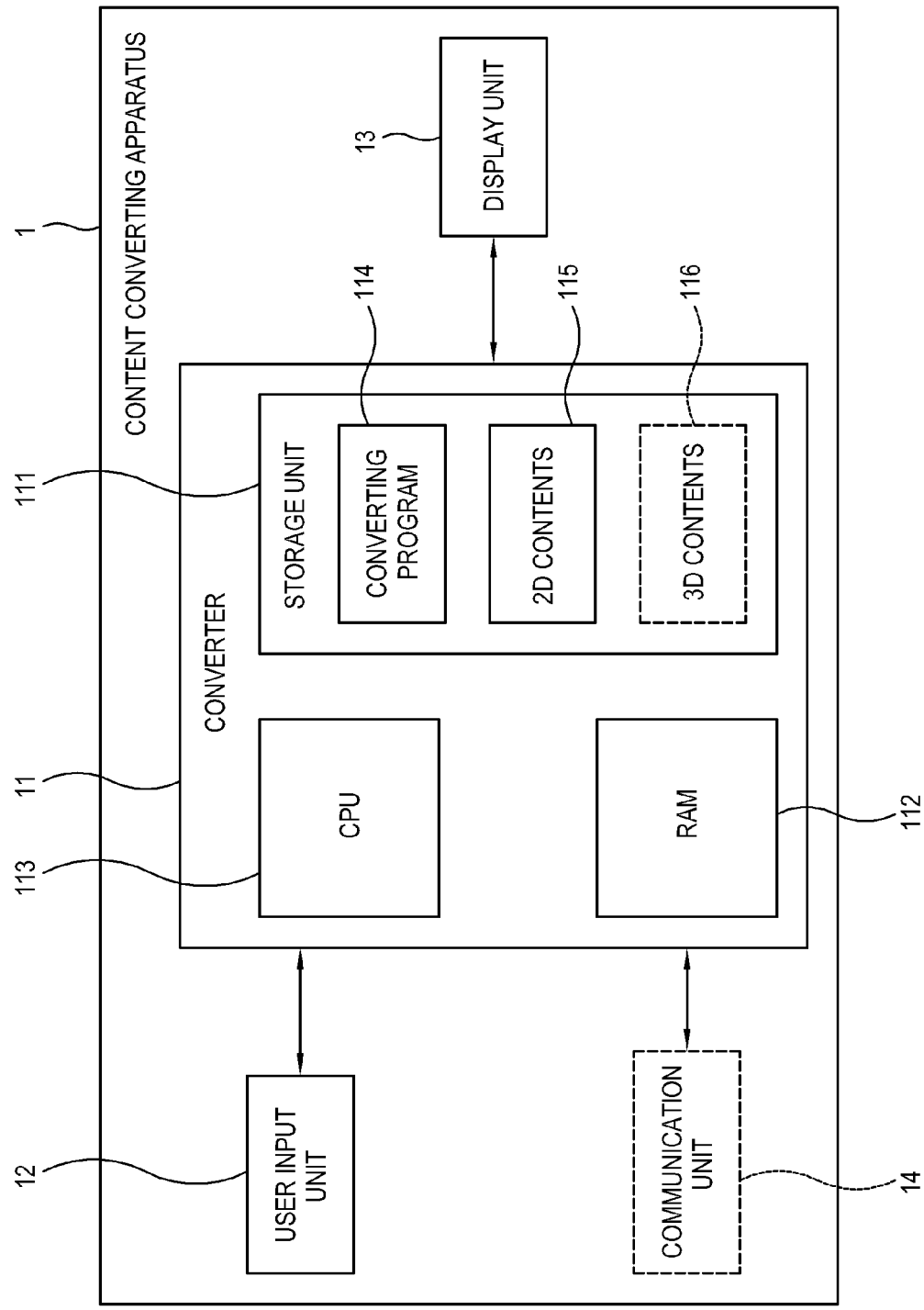
FIG. 1 shows a configuration of a content converting apparatus according to an exemplary embodiment.

Below, the exemplary embodiments will be described in detail with reference to the accompanying drawings. FIG. 1 shows a configuration of a content converting apparatus according to an exemplary embodiment. The content converting apparatus 1 converts 2D contents into 3D contents. In this exemplary embodiment, the contents includes moving picture contents such as films, drama, sports games, etc.

The content converting apparatus 1 may receive the 2D contents to be converted into 3D contents from a predetermined 2D content providing apparatus (not shown). The content converting apparatus 1 may receive the 2D contents from the 2D content providing apparatus through a predetermined network (not shown). The 2D content providing apparatus may be, for example, a network server which stores the 2D contents and provides the 2D contents to the content converting apparatus 1, as requested by the content converting apparatus 1.

Alternatively, the content converting apparatus 1 may receive the 2D contents from the 2D content providing apparatus through a data transmitting means other than the network. For example, the 2D content providing apparatus includes a storage device such as a hard disk drive, flash memory, etc. for storing the 2D content, and is connected as a local device to the content converting apparatus 1. This transmits the 2D contents to the content converting apparatus 1, as requested by the content converting apparatus. In this case, there is no limit to a local connection method between the content converting apparatus 1 and the 2D content providing apparatus as long as it can allow for data transmission of 2D contents. For example, the local connection method may include a universal serial bus (USB), or the like.

Alternatively, the content converting apparatus 1 may receive the 2D contents from a 3D content providing apparatus (not shown). For example, the 3D content providing apparatus transmits the 2D contents to the content converting apparatus 1 and receives the 3D contents converted by the content converting apparatus 1, thereby providing it to a predetermined user terminal (not shown). The user terminal may be a TV, PC, smart phone, smart pad, PMP, MP3 player, etc. having a function of displaying the 3D contents received from the content converting apparatus 1 as a 3D stereoscopic image.

Alternatively, the content converting apparatus 1 may transmit the converted 3D contents to the user terminal which provides the function of displaying the converted contents as a 3D stereoscopic image. For example, the content converting apparatus 1 may provide the 3D contents to the user terminal through the network.

In this exemplary embodiment, there is no limit to network communication such as wired and/or wireless communication, etc. as long as it is data communication for transmitting the 2D contents and/or the 3D contents. Further, the network communication may include all known communications.

As shown in FIG. 1, the content converting apparatus may include a converter 11. The converter 11 converts 2D contents into 3D contents. The 2D contents may include a plurality of video frames (hereinafter, referred to as a 'frame'). The 3D contents based on a viewer's binocular parallax may include a plurality of left-eye frames and a plurality of right-eye frames. Among the plurality of left-eye frames and the plurality of right-eye frames, a pair of left- and right-eye frames may be each converted from at least one corresponding frame from among the plural frames of the 2D contents.

The converter 11 may include a storage unit 111, a random access memory (RAM) 112, and a central processing unit (CPU) 113. The storage unit 111 may store a converting program 114 for implementing the 2D-3D conversion, 2D contents 115 to be converted, and 3D contents 116 converted from the 2D contents. The storage unit 111 may be achieved by a non-volatile memory such as a hard disk drive, flash memory, etc. The RAM 112 is loaded with at least a part of the converting program 114 when the converter 11 operates, and the CPU 113 executes the converting program 114 loaded into the RAM 112. The converting program 114 has instructions executable by the CPU 113. The storage unit 111 is an example of a computer readable recording medium. The conversion from the 2D contents into the 3D contents (hereinafter, referred to as '2D-3D conversion') performed by the converter 11 will be described below.

Figure 2:
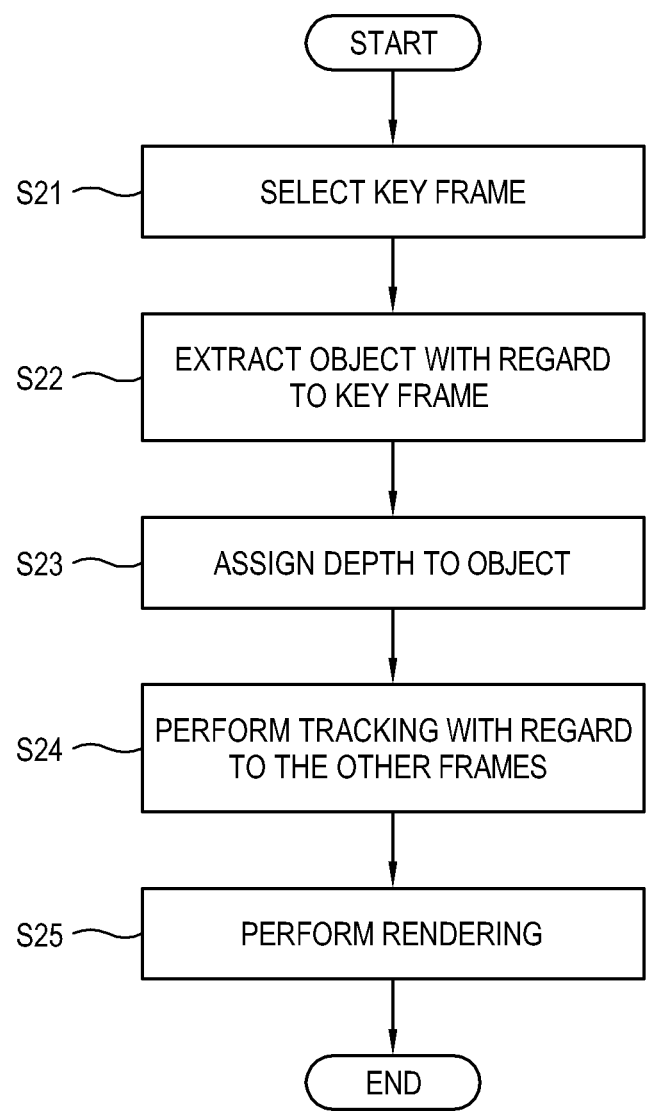
FIG. 2 is a flowchart showing operations of the content converting apparatus of FIG. 1.

FIG. 2 is a flowchart showing operations of the content converting apparatus 1 of FIG. 1. As shown in FIG. 2, operations (hereinafter, referred to as '2D-3D conversion process') of the content converting apparatus 1 correspond to a content converting method implemented by commands of the converting program 114. In this exemplary embodiment, the 2D-3D conversion process may include selecting a key frame at operation S21, extracting an object at operation S22, assigning depth at operation S23, tracking at operation S24 and rendering at operation S25.

First, in the operation S21 of selecting the key frame, an arbitrary key frame is selected from among the plurality of frames of the 2D contents. A frame capable of maximizing accuracy and reliability of the 2D-3D conversion may be selected from among the plurality of frames of 2D contents, as the key frame. The selection of the key frame will be described later.

Referring back to FIG. 2, in the operation S22 of extracting the object, an object on which a 3D effect will be reflected is extracted with respect to the selected key frame. The object is a major image contained in a scene of each frame. For example, the object may be an image of a main character in a scene where the main character appears, an image of a vehicle in a scene where the vehicle is running, etc. In the operation S22 of extracting the object 33, an image of the corresponding frame is segmented so that a boundary of an object can be extracted from the segmentation results.

In the operation S23 of assigning the depth, the depth is assigned to the object extracted in operation S22 of extracting the object. The depth is a parameter for giving a 3D visual effect, which is used in shifting the objects corresponding to the generated left-eye and right-eye frames in left and right directions, as much as a value of the assigned parameter. In the operation S23 of assigning the depth, a previously provided template may be used for assigning the depth.

In the operation S24 of tracking, the depth is assigned to the objects of all frames but the key frame. The tracking operation S24 may be implemented with respect to the object extraction operation S23 and the depth assigning operation S23 applied to the key frame. The tracking operation S24 may be bi-directionally implemented using a previous frame and a later frame with respect to the key frame. That is, corresponding objects in neighbor frames of the key frame are tracked in forward and backward directions of time with respect to the object of the key frame.

As above, the major frame is selected as the key frame, and the object extraction operation S22 and the depth assignment operation S23 are implemented with respect to the selected key frame. Further, the other frames are tracked with reference to the key frame. Therefore, it is possible to perform the conversion processes in a manner which is efficient in cost and time, while maintaining high quality.

In the rendering operation 25, an image process for completing a 3D image is performed with regard to the left- and right-eye frames which experienced the depth assignment operation S23 and the tracking operation S24. For example, in the rendering operation S25, a process of filling a hole area caused by a shift of an object in a frame image, so called "inpainting," may be performed.

At least one of the 2D-3D conversion processes according to the present exemplary embodiment may be carried out on the basis of information about contents and a development process of a scene of a frame to be processed (hereinafter, referred to as "storytelling information"). The storytelling information is information used for giving a 3D visual effect in response to story development of contents, in accordance with the intention of a content producer. In this exemplary embodiment, the object extraction operation S22, the depth assignment operation S23, and the like processes may be performed on the basis of the storytelling information.

At least one process of the 2D-3D conversion processes according to the present exemplary embodiment may include a manual process performed in accordance with a user's input, and an automatic process performed in accordance with preset reference information. For example, in the object extraction operation S22, the depth assignment operation S23 and the like processes, some frames may be processed by the manual processes and the other frames may be processed by the automatic process.

In the manual process, a conversion process may be performed in response to input of a user who performs conversion. The content converting apparatus 1 may further include a user input unit 12 such as a keyboard, mouse, tablet, etc. The content converting apparatus 1 may further include a display unit 13 such as a monitor, or the like, that displays an image undergoing the conversion process. To effectively receive a user's input, the content converting apparatus 1 may display a user interface (UI) including an image of a processed frame, a predetermined input menu, etc. Thus, a user can perform input for the conversion process through the input menu, or the like, of the UI while viewing the image of the frame displayed on the display unit 13. For example, a user may input in order to extract an object through the input menu, or the like, of the UI while viewing the corresponding object contained in an image of a frame. The UI for the conversion process will be described later.

In the automatic process, the process is carried out on the basis of preset reference information. For example, in the object extraction operation S22, the content converting apparatus 1 analyzes an image of a frame, and selects as an object to be extracted, of which change in a pixel value at a boundary of an object is not less than a predetermined threshold value. Here, the reference information for selecting the object to be extracted may be the threshold value of the change in the pixel value at the boundary of the object.

The 2D-3D conversion process may be performed in a manner which corresponds to quality of 3D contents. The quality of the 3D contents may show how much of the manual process and the automatic process are respectively performed in the 2D-3D conversion process. For example, half of the object extraction operation S22 may be performed by the manual process and half of the object extraction process may be performed by the automatic process. The quality of the 3D contents is divided into a plurality of quality modes. In accordance with one quality mode selected from among the plural quality modes, the 2D-3D conversion process may be performed. The quality of the 3D contents may be determined in accordance with the type and format of the 2D contents.

In addition, 3D-image quality enhancement may be further performed on a frame experience the rendering operation S25. The 3D-image quality enhancement may include contrast enhancement, detail enhancement, etc. Through the 3D-image quality enhancement, image quality enhancement may be achieved to optimize image quality in a display device, when 3D contents are actually displayed.

Further, the content converting apparatus 1 may additionally include a communication unit 14. The communication unit 14 may perform data communication between the 2D content providing apparatus and the content converting apparatus 1. Communication unit 14 may also perform data communication between the 3D content providing apparatus and the content converting apparatus 1, or data communication between the user terminal and the content converting apparatus 1.

Figure 3:
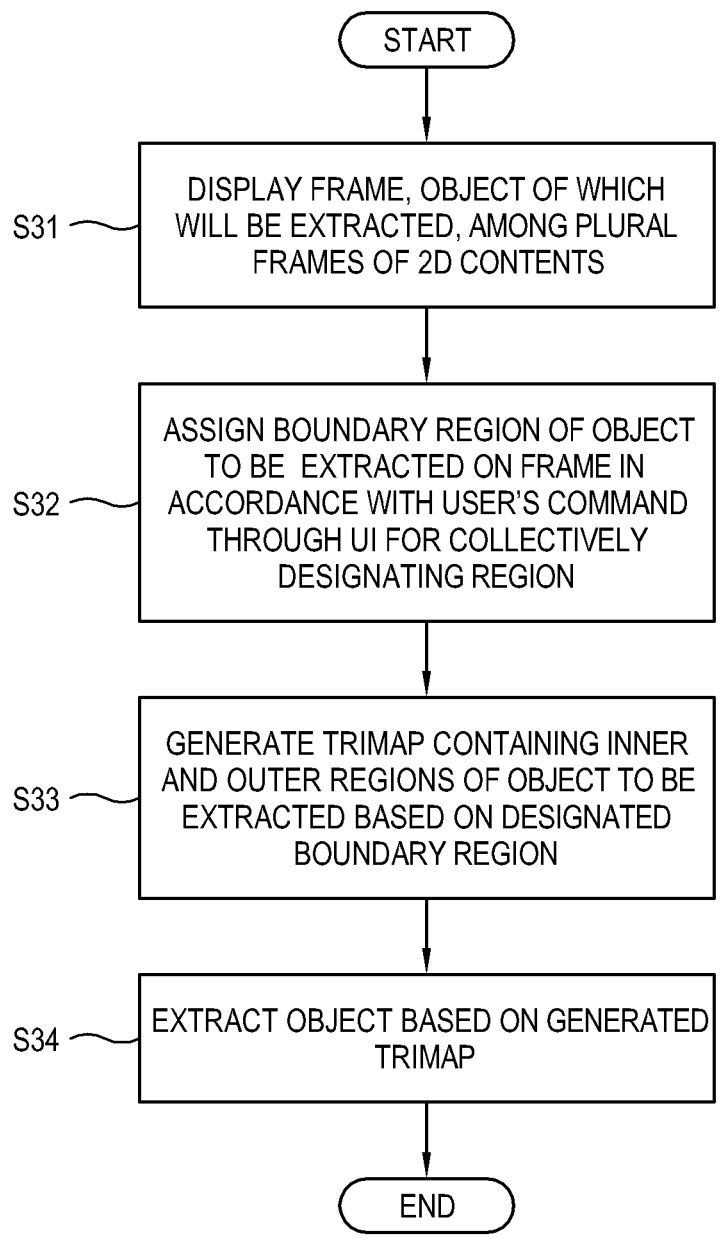
FIG. 3 is a flowchart showing an example of detailed operations of the content converting apparatus shown in FIGS. 1 and 2.

FIG. 3 is a flowchart showing an example of detailed operations of the content converting apparatus 1 shown in FIGS. 1 and 2. The operation of the content converting apparatus 1 shown in FIG. 3 may be an example of detailed operations of the object extraction operation S22 shown in FIG. 2. In the object extraction shown in FIG. 3, a frame is divided into three regions, i.e., an inner region which corresponds to an object, an outer region which corresponds to a background, or the like, of the object, and a boundary region which corresponds to a blurred region between the inner region and the outer region, and may employ a trimap for assigning a predetermined depth to each of the regions. In the trimap, for example, '1' may be given to the inner region, '0' may be given to the outer region, and a value larger than '0' but smaller than '1' may be given to the boundary region. For example, an algorithm such as "alpha process" or "alpha matte" may be used when giving the value to the boundary region.

Figure 4:
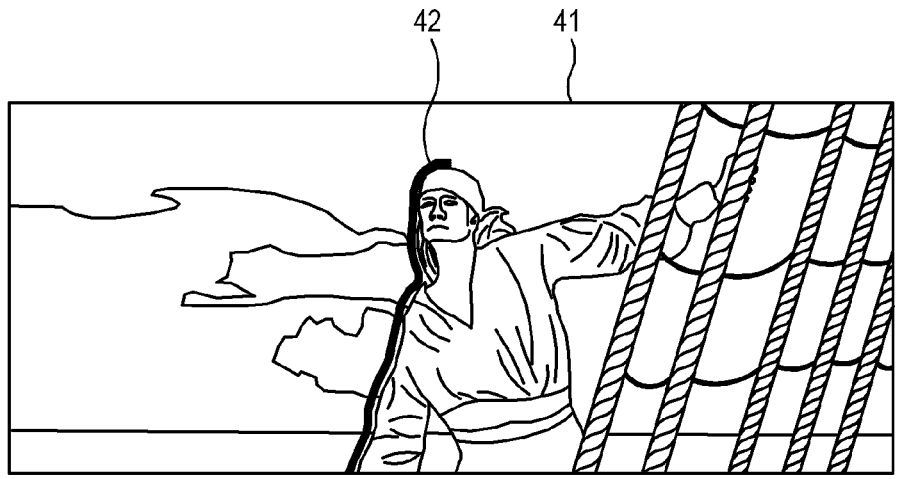
FIGS. 4 to 6 show an example of a UI offered by the content converting apparatus shown in FIGS. 1 to 3.

Referring to FIG. 3, first, at operation S31, the content converting apparatus 1 displays a frame, an object of which will be extracted, from among a plurality of frames having 2D contents. FIG. 4 shows an example of the frame 41 displayed at the operation S31 of FIG. 3.

Next, referring back to FIG. 3, at operation S32, the content converting apparatus 1 uses a UI for collectively designating the region, thereby designating the boundary region of the object to be extracted on the frame in accordance with a user command. Referring to FIG. 4, the content converting apparatus 1 provides UI 42 for collectively designating the region on the frame 41 in accordance with the user's manipulation. The UI 42 shown in FIG. 4 is shaped like a line having a predetermined thickness, thereby allowing a user to draw the line for designating the boundary region on the frame 41. Through the UI 42, a user can draw the line having the predetermined thickness along an outline of an object to be extracted, while viewing the frame 41. Here, the thickness of the line may be varied depending on the user command.

Figure 5:
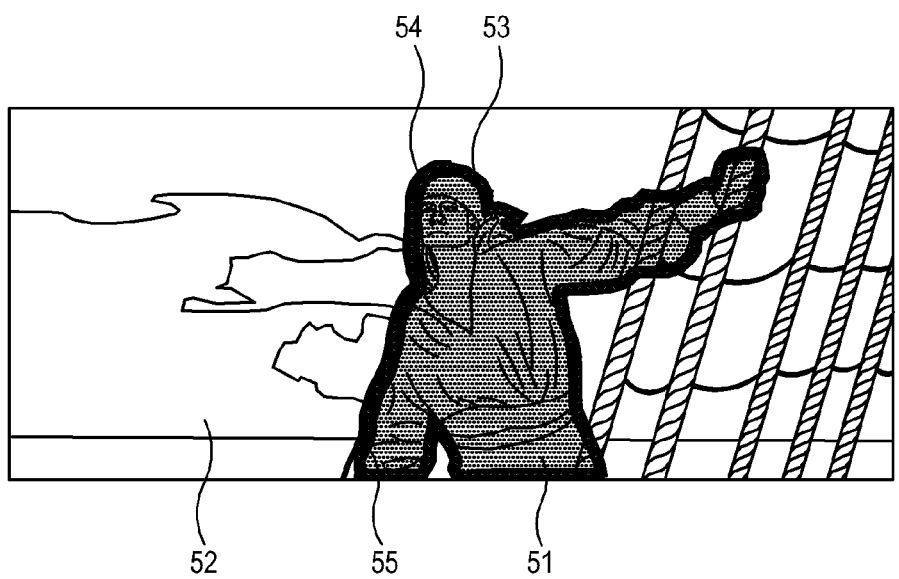

FIG. 5 shows a detailed example for designating the boundary region through the UI shown in FIG. 4. As shown in FIG. 5, the line having a predetermined thickness drawn through the UI includes an inner boundary 55 and an outer boundary 54. The inner boundary 55 and the outer boundary 54 shown in FIG. 5 are exaggerated, as illustrated, as a matter of convenience, and may be shown differently in a real UI. The region formed by the inner boundary 55 and the outer boundary 54 becomes the boundary region 53. The inner boundary 55 may be used in determining the inner region 51 in the trimap, and the outer boundary 54 may be used in determining the outer region 52.

Figure 6:
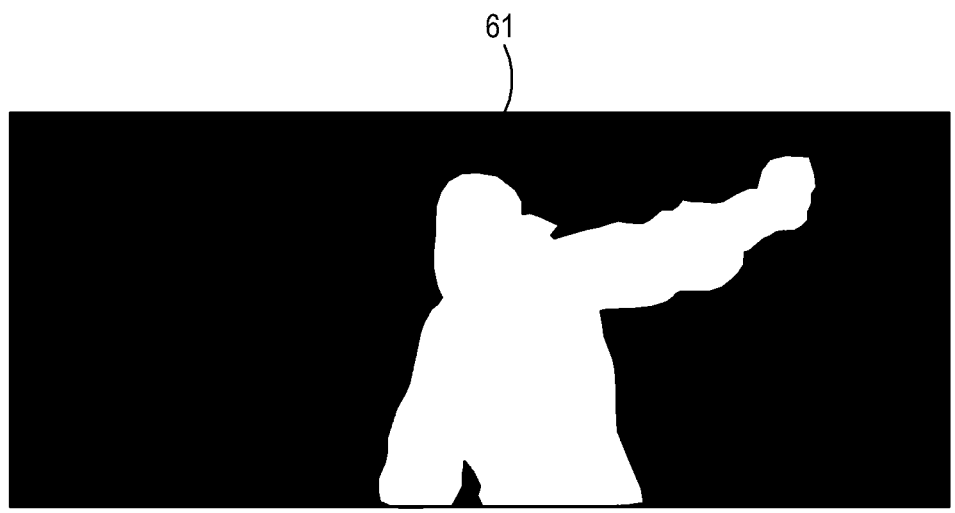

Referring back to FIG. 3, at operation S33, the content converting apparatus 1 generates a trimap containing the inner and outer regions of the object to be extracted based on the designated boundary region. Next, at operation S34, the content converting apparatus 1 extracts an object based on the generated trimap. FIG. 6 shows an example of the object 61 obtained based on the trimap.

As above, according to the content converting apparatus in this exemplary embodiment, the trimap containing the inner and outer regions together with the boundary region of the object to be extracted can be configured at once through the UI for collectively designating the regions on the frame, so that a user can more conveniently and efficiently extract the object without having to designate the inner, outer and boundary regions one-by-one.

According to the content converting apparatus in this exemplary embodiment, the thickness of the line for designating the boundary region is adjustable. The thicker the line, the larger the boundary region. The thinner the line, the smaller the boundary region. Therefore, if the line is thick, a user can, with relative ease, designate the outline of the object as the boundary region. However, as the boundary region becomes larger, a lot of algorithms are needed for a blurred region, and therefore a significant processing load is applied to the content converting apparatus 1. Accordingly, a user can effectively adjust the degree of difficulty in work or the processing load of the apparatus by taking into account the state of the outline of the object to be extracted.

Figure 7:
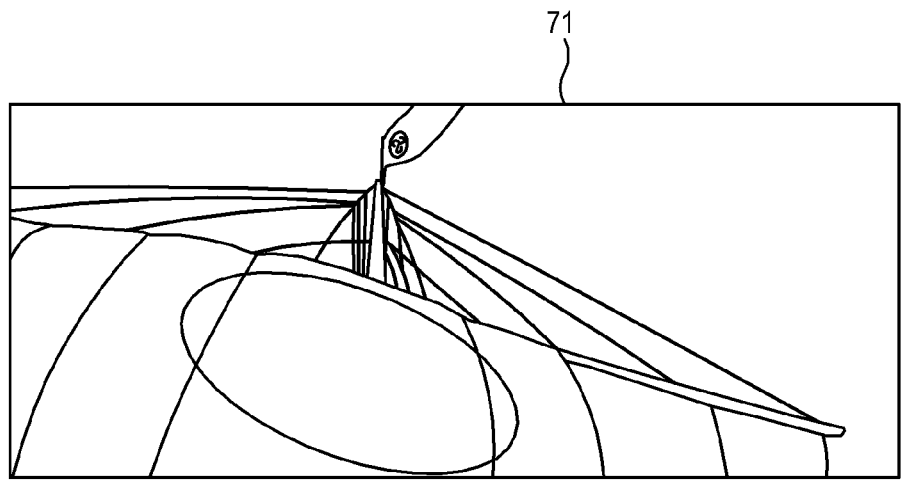
FIGS. 7 to 10 show another example of a UI offered by the content converting apparatus shown in FIGS. 1 to 3.
Figure 8:
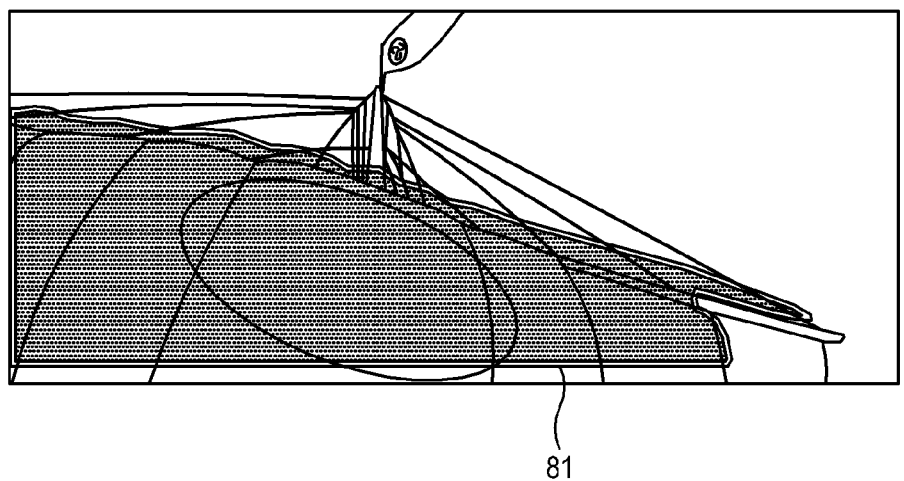

Referring to FIGS. 7 to 10, another example of the object extraction operation of the content converting apparatus 1 will be described. With regard to the content converting apparatus 1 to be described with reference to FIGS. 7 to 10, the same or similar parts to those described with reference to FIGS. 3 to 6 will be omitted. As shown in FIG. 7, the content converting apparatus 1 displays a frame 71 containing an object to be extracted. Next, the content converting apparatus 1 designates the inner region of the object to be extracted in accordance with a user command. For example, as shown in FIG. 8, a user can designate a major portion of an object to be extracted from the frame, i.e., a portion 81 where the outline of the object is distinctive, as the inner region through a predetermined UI offered by the content converting apparatus 1.

Figure 9:
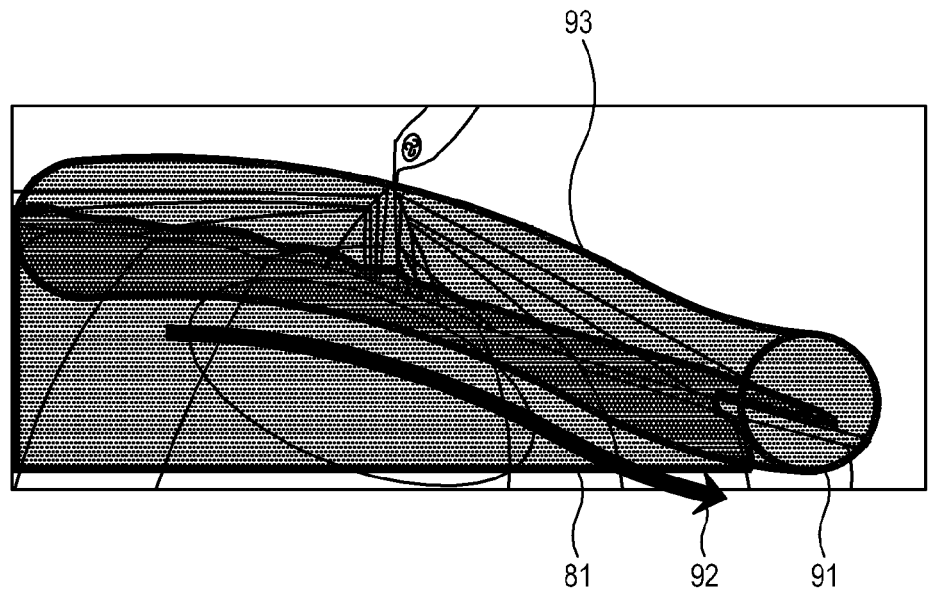
Figure 10:
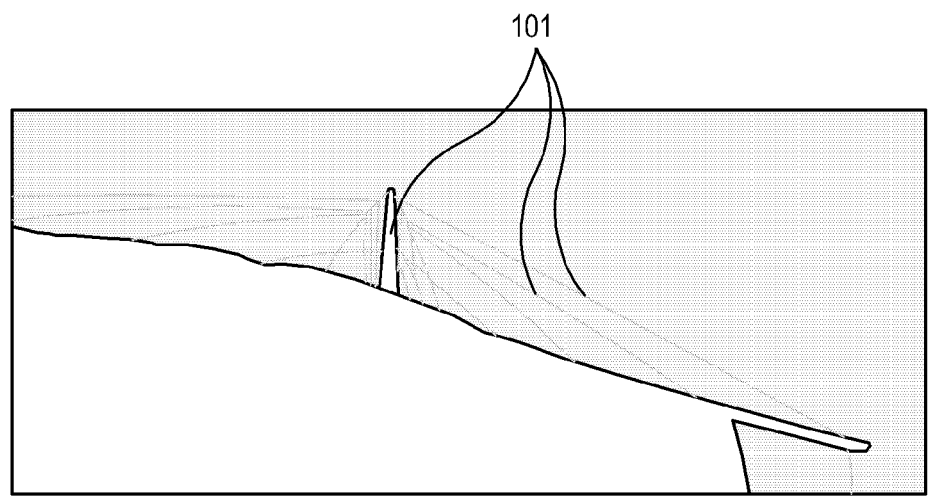

Next, the content converting apparatus 1 displays a UI for designating the boundary region on the frame. For example, as shown in FIG. 9, the content converting apparatus may provide a UI 91 shown in a figure such as a circle having a predetermined size. A user moves the UI 91 shown in the figure in a desired direction 92 at a proper position, so that a portion where the outline of the object is blurred can be designated as the boundary region. The region 93 formed by trace where the UI 91 shown in the figure is moved is determined as the boundary region. Also, the size of the UI 91 shown in the figure may be adjusted according to a user command. Then, the portion designated as the boundary region 93 may experience the alpha process, or the like, algorithm in consideration of relationship with the inner region 81. The content converting apparatus 1 generates the trimap based on the designated inner and boundary regions 81 and 93, and extracts an object based on the trimap. FIG. 10 shows an example of an object 101 obtained based on such a trimap.

According to this exemplary embodiment, when an object having both the distinctive portion and the blurred portion is extracted, the distinctive outline is first designated as the inner region of the object, and the blurred outline is designated as the boundary region through the UI capable of collectively designating the regions. Accordingly, the algorithm is applied to only the portion designated as the boundary region except the portion designated as the inner region, thereby minimizing the work load of the content converting apparatus 1.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of converting video contents, which converts two-dimensional (2D) contents into three-dimensional (3D) contents through a content converting apparatus, the method comprising:
    displaying a frame including an object which will be extracted, from among plural frames contained in the 2D contents;
    displaying a user interface (UI) comprising a line having a predetermined thickness in a region between inner region and outer region of the object to be extracted on the displayed frame;
    designating a boundary region between the inner region and the outer region of the object to be extracted on the displayed frame based on a user input on the displayed UI;
    generating a trimap comprising the designated boundary region, the inner region and the outer region of the object to be extracted; and
    extracting the object based on the generated trimap.

2. The method according to claim 1, wherein the designating of the boundary region comprises designating an inner boundary and an outer boundary spaced apart from each other by a predetermined thickness, and the generating of the trimap comprises determining the inner region based on the inner boundary, determining the outer region based on the outer boundary, and designating a region between the inner boundary and the outer boundary as the boundary region.

3. The method according to claim 1, further comprising adjusting the thickness of the line in accordance with a user command.

4. The method according to claim 1, further comprising designating the inner region of the object to be extracted in accordance with a user command through the UI, and the designating the boundary region comprises designating the boundary region with regard to the designated inner region.

5. The method according to claim 4, wherein the UI is shown in a figure having a predetermined size, and the designating of the boundary region comprises designating a region, formed by trace where the figure is moved in accordance with a user command, as the boundary region.

6. The method according to claim 5, wherein the figure comprises a circle.

7. The method according to claim 5, further comprising setting the size of the figure in accordance with a user command.

8. An apparatus for converting video contents, which converts two-dimensional (2D) contents into three-dimensional (3D) contents, the apparatus comprising:

a user input unit which receives a user command;
a display unit; and
a converter which displays a frame including an object which will be extracted from among plural frames contained in the 2D contents, displays a user interface (UI) comprising a line having a predetermined thickness in a region between inner region and outer region of the object to be extracted on the displayed frame, designates a boundary region between the inner region and the outer region of the object to be extracted on the displayed frame based on a user input on the displayed UI, generates a trimap comprising the designated boundary region, the inner region and the outer regions of the object to be extracted, based on the designated boundary region, and extracts the object based on the generated trimap.

9. The apparatus according to claim 8, wherein the converter designates the boundary region by designating an inner boundary and an outer boundary spaced from each other by a predetermined thickness, determines the inner region based on the inner boundary, determines the outer region based on the outer boundary, and designates a region between the inner boundary and the outer boundary to be the boundary region.

10. The apparatus according to claim 8, wherein the converter adjusts the thickness of the line in accordance with a user command.

11. The apparatus according to claim 8, wherein the converter designates the inner region of the object to be extracted in accordance with a user command through the UI, and designates the boundary region with regard to the designated inner region.

12. The apparatus according to claim 11, wherein the UI is shown in a figure having a predetermined size, and the converter designates a region, formed by trace where the figure is moved in accordance with a user command, as the boundary region.

13. The apparatus according to claim 12, wherein the figure comprises a circle.

14. The apparatus according to claim 12, wherein the converter adjusts the size of the figure in accordance with a user command.

15. A method of converting video contents, which converts two-dimensional (2D) contents into three-dimensional (3D) contents through a content converting apparatus, the method comprising:

displaying a 2D frame including an object which will be extracted;

displaying a user interface (UI) comprising a line having a predetermined thickness in a region between inner region and outer region of the object to be extracted on the displayed frame;

designating a boundary region between the inner region and the outer region of the object to be extracted on the displayed frame based on a user input on the displayed UI;

generating a trimap comprising the designated boundary region, the inner region and the outer regions of the object to be extracted; and extracting the object based on the generated trimap.

16. The method of converting video contents of claim 15, further comprising displaying the frame from among frames contained in the 2D contents.

17. The method of converting video contents of claim 15, wherein the designating of the boundary region comprises designating an inner boundary and an outer boundary spaced apart from each other by a predetermined thickness.

18. The method of converting video contents of claim 15, wherein the generating of the trimap comprises determining the inner region based on the inner boundary, determining the outer region based on the outer boundary, and designating a region between the inner boundary and the outer boundary as the boundary region.

19. An apparatus for converting video contents, which converts two-dimensional (2D) contents into three-dimensional (3D) contents, the apparatus comprising:

a converter which displays a 2D frame including an object which will be extracted, displays a user interface (UI) comprising a line having a predetermined thickness in a region between inner region and outer region of the object to be extracted on the displayed frame, designates a boundary region between the inner region and the outer region of an object to be extracted on the displayed frame based on a user input on the displayed UI, generates a trimap comprising the designated boundary region, the inner region and the outer regions of the object to be extracted, and extracts the object based on the generated trimap.

20. The apparatus for converting video content according to claim 19, further comprising:

a user input unit which receives a user command; and
a display unit.

21. The apparatus for converting video content according to claim 19, wherein the generating the trimap is based on the designated boundary region.

* * * * *